(12) United States Patent
Singh (10) Patent No.: US 8,910,649 B2
(45) Date of Patent: Dec. 16, 2014

(54) READILY CLEANABLE WATER STORAGE SYSTEM AND METHOD

(76) Inventor: Jainendra Kumar Singh, Patna (IN)

(*) Notice: Subject to any disclaimer, the term of this patent is extended or adjusted under 35 U.S.C. 154(b) by 44 days.

(21) Appl. No.: 13/383,013

(22) PCT Filed: Jul. 6, 2010

(86) PCT No.: PCT/IB2010/001692
§ 371 (c)(1),
(2), (4) Date: Jan. 9, 2012

(87) PCT Pub. No.: WO2011/007233
PCT Pub. Date: Jan. 20, 2011

(65) Prior Publication Data
US 2012/0111431 A1    May 10, 2012

(30) Foreign Application Priority Data
Jul. 15, 2009    (IN) .............................. 973/KOL/2009

(51) Int. Cl.
*B08B 9/08*    (2006.01)
*E03B 11/02*    (2006.01)

(52) U.S. Cl.
CPC ...................................... *E03B 11/02* (2013.01)
USPC ........ 137/15.05; 137/237; 137/592; 251/144; 220/567

(58) Field of Classification Search
USPC .............. 137/237, 238, 240, 590, 592, 15.04, 137/15.05; 220/567; 251/144, 129.04
See application file for complete search history.

(56) References Cited

U.S. PATENT DOCUMENTS

| | | | | |
|---|---|---|---|---|
| 2,538,412 | A * | 1/1951 | Cecil et al. | 210/603 |
| 3,319,834 | A * | 5/1967 | Steele | 222/146.2 |
| 3,709,463 | A * | 1/1973 | Griparis | 251/129.02 |
| 3,978,716 | A * | 9/1976 | Kirschke | 73/86 |
| 4,603,733 | A * | 8/1986 | Loevinger | 165/41 |
| 4,664,143 | A * | 5/1987 | Thompson | 137/565.16 |
| 5,236,824 | A * | 8/1993 | Fujiwara et al. | 435/5 |
| 5,718,351 | A * | 2/1998 | Rude | 220/571 |
| 6,508,208 | B1 * | 1/2003 | Frasure et al. | 122/388 |
| 8,328,409 | B2 * | 12/2012 | Whitney et al. | 366/136 |

FOREIGN PATENT DOCUMENTS

| | | |
|---|---|---|
| GB | 2 261 464 | 5/1993 |
| WO | 2007/013751 | 2/2007 |
| WO | 2008/072881 | 6/2008 |

OTHER PUBLICATIONS

"Water Storage: Tanks, Cisterns, Aquifers, and Ponds for Domestic Supply, Fire and Emergency Use," Oikos Green Building Library, http://oikos.com/library/water_storage/index.html, book published May 30, 2005, pp. 1-8.

* cited by examiner

*Primary Examiner* — Kevin Lee
(74) *Attorney, Agent, or Firm* — Jacobson Holman Hershkovitz (57) ABSTRACT

A readily cleanable water storage system and a method of maintaining cleanliness of water in said system are disclosed. The system comprises an overhead water tank, wherein said water tank comprises a floor, at least one inlet, a draining outlet with a stop cock, an overflow outlet, a supply outlet and a pump, characterized in that the floor of the tank is inclined at a pre-determined continuous and effective slope either towards another point on the periphery to form an inclined floor, or from all sides to form a conical bottom with the supply outlet located at the side wall of the tank above the conical bottom and the draining outlet is located at the periphery of the inclined floor at sloping end or at the convergence of the cone formed by the conical bottom.

10 Claims, 6 Drawing Sheets

READILY CLEANABLE WATER STORAGE SYSTEM AND METHOD

This is a national stage of PCT/IB10/001692 filed Jul. 6, 2010 and published in English, which claims the priority of India number 973/KOL/2009 filed Jul. 15, 2009, hereby incorporated by reference.

FIELD OF THE INVENTION

This invention relates to an improved water tank and method of cleaning thereof and particularly to a water tank primarily used for storing potable and other kind of water in which high level of cleanliness can be maintained with considerable ease in a cost effective manner.

BACKGROUND OF THE INVENTION

Storage of water is essential before distribution to the consumer through a pipeline. To this end, water tanks of various sizes and kinds are used. Tanks made out of metal, brick and mortar are now giving way to those of plastic or synthetic materials due to various reasons like cost effectiveness, ease of installation and maintenance, non-susceptibility to leakages, etc. Wooden water tanks are also in use in certain regions of the world.

However, one cause of concern in all kinds of water tanks currently available is its poor level of cleanliness and that of its contents. Water entering the tank from the city's water source invariably contains some foreign matters. Over a period of time the foreign matters in the form of suspended impurities settles to the bottom of the tank and requires periodic cleaning. It is not unusual for a tank to accumulate anywhere up to an inch or so of muddy sediments over a period of time, a residue that pose severe health hazard for the consumers.

Water tanks have not changed much during the past hundred years or so. Some of the techniques used in their construction have been improved resulting in shorter manufacturing and installation time, but the overall principle of water tanks remains unchanged.

Conventional water tanks in use are either rectangular or cylindrical in shape in general and the outlet for supply of water to consumers is at a point on its sidewall slightly above its bottom. This point is so chosen so as to allow all the suspended contaminants, dirt and muddy substances in the water to settle down on the bottom surface that do not pass into the supply outlet located above the deposited sediments. These impurities keep on depositing on the floor of the tank turning into a sludge over a period of time, which require to be thoroughly scrubbed in order to dislodge it effectively. This cleaning is an elaborate process requiring some preparation and stoppage of water supply to the consumers for a considerable period. Considerable time and effort is spent in scrubbing out those sticky deposited materials. Since the outlet from the tank is a bit above the bottom, all the scrubbed material along with water remaining below this outlet requires to be lifted and thrown out with the help of buckets, mugs, or by other means. This is followed by sponge drying of the bottom surface and disinfecting the inside walls of the tank. All this is a lengthy and clumsy process and still does not assure a high level of cleanliness. Further, it may leave scratches on the floor of the tank that may corrode the tank progressively. Also, the lengthiness of the process tends to reduce its frequency, thereby compelling the consumers to consume harmful contaminated water indefinitely.

During the daily chore of filling of tank, the falling mass of water inside the tank dislodges part of the said layer of sediments from the floor and this material rises above to dance and revolve with the agitated mass of water. This continues till the filling of water progresses. It also settles partly on the side walls of the tank thereby dirtying them as well. Most of these foreign matters remain in a suspended state owing to buoyancy for considerable time and continue to pass on to the supply route away from the tank. Till such time the users are forced to continue consuming such contaminated water for various uses in the bath, kitchen, washing, etc., and for drinking. Also, a part of the impurities and dirt, which is soluble, gets dissolved during the swirling agitation of water and may not be detected visually. All this make the supplied water a carrier of impurities which gets thicker and denser with every passing day and good part of it is also deposited on the inside wall of the water supply line thereby reducing the flow rate with passage of time. This is a compulsion everyone lives with which is not realized because the dirty scene of action happens to be away in the closed tank at the top of the building and one cannot make out dirtiness by simply looking at the water at the receiving end.

It is true that some people keep water filters at the users' end in order to get clean potable water. But there are again several factors that decide the quality of water one gets from it. These may be like quality assurance associated with that filter, whether that filter is properly maintained or not with timely replacement of cartridges, candles, etc. Again, water filters are primarily used for the purpose of drinking water only. Bulk of the water supply is directly used during bathing, brushing teeth, washing mouth after meals, food preparation, etc. Therefore, one still remains vulnerable to the dirty water coming from the supply route from that overhead tank.

So, a vast majority of human population, with the exception of those people who live in remote areas where such tanks are not used for storage of potable water, has no way but to consume such contaminated water.

Potable water is a basic necessity of life and deserves the same level of care, cleanliness and respect as any other food item. Every utensil handling food items is given a complete washing in dishwasher or manually and in the same fashion the water storage tank should be maintained with complete renewal of stored water regularly. This does not happen in the conventional tank and total cleanliness is erroneously presumed. With every filling of the tank, certain amount of stale water remains in the bottom along with those muddy sediments. It is happening despite countless people being involved in the business of storage water tank right from design and manufacture, distribution and dealers' network to plumbing and installation and finally to end users. Also, there is a vast network of tank maintenance and cleaning companies and establishments which specialize in the expertise of tank cleaning. These people follow elaborate processes for the job and charge substantially. In spite of the involvement of technical people, the scenario remains the same.

So, an urgent solution was needed so that the regular renewal of the water content in the tank is possible in order to ensure a high cleanliness level of water within the tank in a cost effective, convenient and time-saving manner.

The objective of this invention is to present a solution in the shape of an improved design of a water tank and a method of cleaning the same which ensures a comparatively much higher level of cleanliness of water for the consumers. It ensures complete renewal of the water content of the tank in an extremely convenient method which can be carried out regularly and swiftly with utmost ease in a cost effective manner.

SUMMARY OF THE INVENTION

The present invention lies in the shape of a water tank which appears more or less similar to conventional water tank from the outside except for the bottom side. The tank may be of cylindrical, rectangular or any other shape and may be made of any material. The major difference lies in the bottom of the proposed tank which is inclined with a continuous effective slope so that all the water inside rushes towards the slope of the inclined bottom. It has an outlet for complete drain out of water from the said inclined bottom surface. This outlet, which may be located anywhere along the periphery of the bottom at the end of the slope or at the bottom of the tank itself, is meant for draining out the water inside the tank completely whenever desired. This draining outlet may be extended through extra pipeline to a convenient place and a stop cock provided at that point to discontinue the discharge of water from drainage outlet. Alternatively, a drainage outlet is provided with electronically operated stopping means that can be remotely controlled for convenience of the cleaning operation. When the said draining outlet is opened, the water from inside the tank starts flowing out and as the water level approaches the bottom of the tank, all of it rushes towards the said exit at the lowest point as no water can remain on the slant surface of the bottom. The draining outlet at the lowest point of slope should not have any protrusions or edges towards the inside, which may obstruct exit of the sediments, impurities, etc. The mouth of the draining outlet should have a smooth converging easy curvature for uninterrupted flow of drainage water therethrough. Bend sections in extended pipeline may be kept at a minimum.

Eventually the tank empties by itself without any special effort made for the purpose in contrast with the conventional tank which requires cleaning personnel to go inside and lift water from the bottom with considerable effort. All the sediments and other foreign matter also rush out through the said draining outlet without any external action involved. After the tank empties itself on its own, the water inlet for filling the tank is opened. Water starts falling on the said bottom of the tank which further cleans the bottom and flushes further dirt, if any, towards the said draining outlet and is drained out. Some time is allowed for this process to continue before the said draining outlet is closed and water filling in the tank starts for storage. The outlet for supply to consumers is fixed at a point higher than the said bottom of tank described above so that only clean water goes into the supply line. Therefore, the consumers do not get any contaminated water as in the case of conventional tanks wherein all the sediments and impurities continue to accumulate progressively at the bottom with passage of time that contaminates the water in the supply line as discussed above.

There may appear a wastage of a small amount of water mass which lies between the said supply outlet and the draining outlet in the process of this complete renewal of water. This is only notional, because this water can be directed towards some other utilities where potable grade water is not required, like floor and other type of cleanings, gardening, watering of plants and trees, washing of vehicles, etc.

Accordingly, the present invention provides a storage tank having an inclined bottom with a continuous and effective slope which automatically rushes all the water content towards the draining outlet located at the end of the said slope. The supply outlet for consumers is little above the bottom of the tank.

The said draining outlet is optionally extended to a place convenient for the user to operate and a stopping mechanism provided at that point so that the operator can close or open the said draining outlet from that point whenever required. Alternatively, an electronically controlled stopping means can be provided closer to the water tank, with a remote control switch available with the operator for an easy operation especially in case of taller buildings where extending the draining outlet by extra pipeline may not be cost effective or remain trouble-free.

The tank may be emptied periodically or preferably before every filling by opening the said draining outlet, some fresh water allowed through the inlet and allowed to drain out and then fresh water stored by closing the draining outlet.

The small amount of tank water which comes out of the draining outlet, during periodic renewal of water in the tank, may be optionally directed towards non potable usage thereby saving water from wastage, even during the periodic renewal of water in the tank.

The bottom of the tank may also be inclined from all the sides into a conical funnel shaped bottom with draining outlet located at the convergence point of the cone.

The present invention thus provides an improved water tank for storing potable and other kind of water, said water tank comprising a floor, an inlet for letting water to be filled into said tank, a draining outlet with a stop cock fitted thereto, an overflow outlet, and a consumer supply outlet through which water is supplied to consumers, characterized in that the floor is inclined at a pre-determined continuous and effective slope and the draining outlet is located at the periphery of the sloping end of the floor or at the bottom of the tank.

The draining outlet is preferably located at the periphery of the tank close to the sloping end of said inclined floor. The draining outlet may be optionally extended to a place convenient for the user to operate and a stopping mechanism provided at that point so that the operator can close or open said draining outlet from that point. A remotely electronically controlled stopping mechanism may be provided closer to the water tank, with the remote control switch available with the operator for easy operation, particularly in taller buildings. The stop cock or the remote control switch is preferably accessible and capable of being operated from the ground level by virtue of being fitted in an extended draining outlet pipe closer to ground level. The stop cock or remote control switch for draining outlet is most preferably located close to the pump room housing the pump which supplies water to said tank. The supply outlet for consumers is disposed little above the bottom of the tank and the water inlet is located at a point to discharge the water near the starting end of the sloping floor of the tank. The bottom of the water tank may be inclined from all the sides to make a cone and the supply outlet can be located at the side wall of the tank preferably above the conical bottom of the tank. A draining outlet pipe may be located at the point of convergence of the cone, the draining outlet pipe extending to a convenient place at the lower floor preferably ground floor for periodic cleaning of the water tank through a stop cock. The water inlet(s) is/are located so as to discharge the inlet water on the inclined surface(s) of the conical bottom of the tank.

The present invention also provides a method of cleaning a water tank involving the steps of draining out the contents of the tank by operating a stop cock of the draining outlet, filling water in the tank by operating a pump while keeping the stop cock open to dislodge the sediments and deposits, removing said sediments and deposits through draining outlet (22, 26, 30), and closing the stop cock (27) after all sediments and deposits are removed to hold clean water.

Water from the inlet falls directly on the sludge and sediments if any collected at the bottom of the water tank such that those are easily dislodged. Occasionally, a sponge or cloth like cleaner or brush attached to a long handle is used to rub out and clean the bottom and walls of the tank, followed by water being allowed to flow in the said tank for a few minutes through draining outlet for final cleaning before closing the stop cock of the said draining outlet to hold fresh clean water in the tank. The periodicity of the cleaning schedule may be daily, weekly, fortnightly or monthly. The tank may have a conical funnel shaped bottom and the discharge from the inlet is directed to different points on the inclined surfaces of the conical bottom of the tank by manipulating the inlets for pumped water in the tank.

BRIEF DESCRIPTION OF THE ACCOMPANYING DRAWINGS

This invention is described below with the help of accompanying drawings in which:—

DESCRIPTION OF THE PREFERRED EMBODIMENTS

Figure 1:
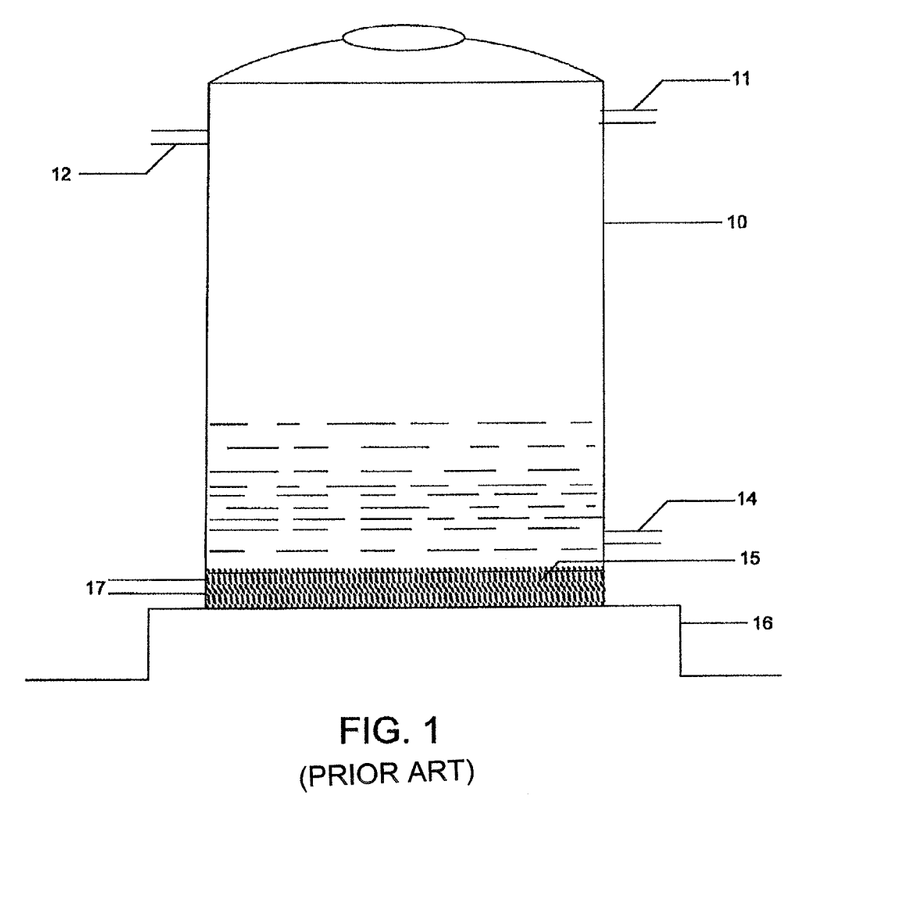
FIG. 1 illustrates a conventional common rooftop water tank and its working.

FIG. 1 shows a conventional water tank 10 erected on the base 16 commonly in use today wherein water is filled through the inlet pipe 11 into the tank and the surplus water during the filling process exits through overflow pipe 12. The outlet 14 is for consumer supply through which water is sent to the consumers. The sediments and foreign matter 15 that have deposited at the floor of the tank over a period of time can be seen. An outlet 17 is provided for draining water during the periodic cleaning of the tank.

Figure 2:
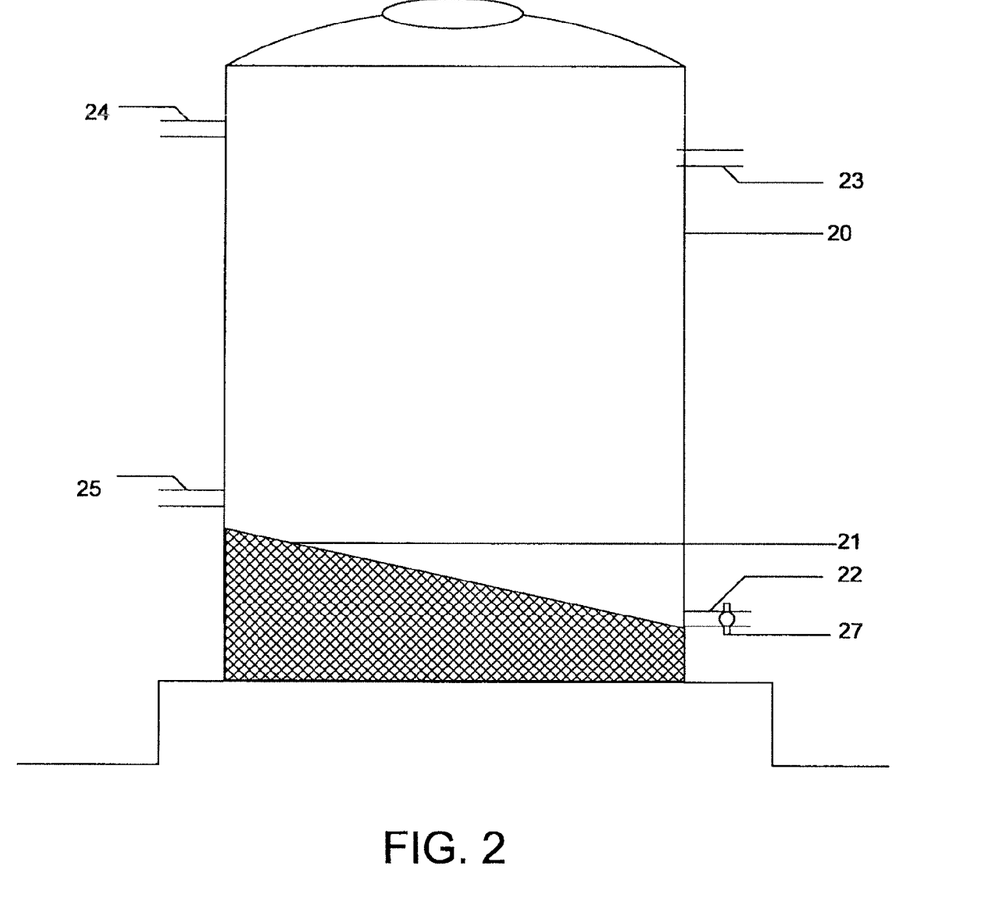
FIG. 2 illustrates a water tank according to one embodiment of the invention and its working.

FIG. 2 shows a preferred embodiment of the present invention in which the inclined floor 21 of the water tank 20 is shown and a draining outlet 22 with a stop cock (27) is located at a point at the end of the slope of the said inclined floor 21. The inlet 24 is meant for water to be filled into the tank by a pump or other means with overflow outlet 23. The consumer supply outlet 25 supplies water to its consumers.

Figure 3:
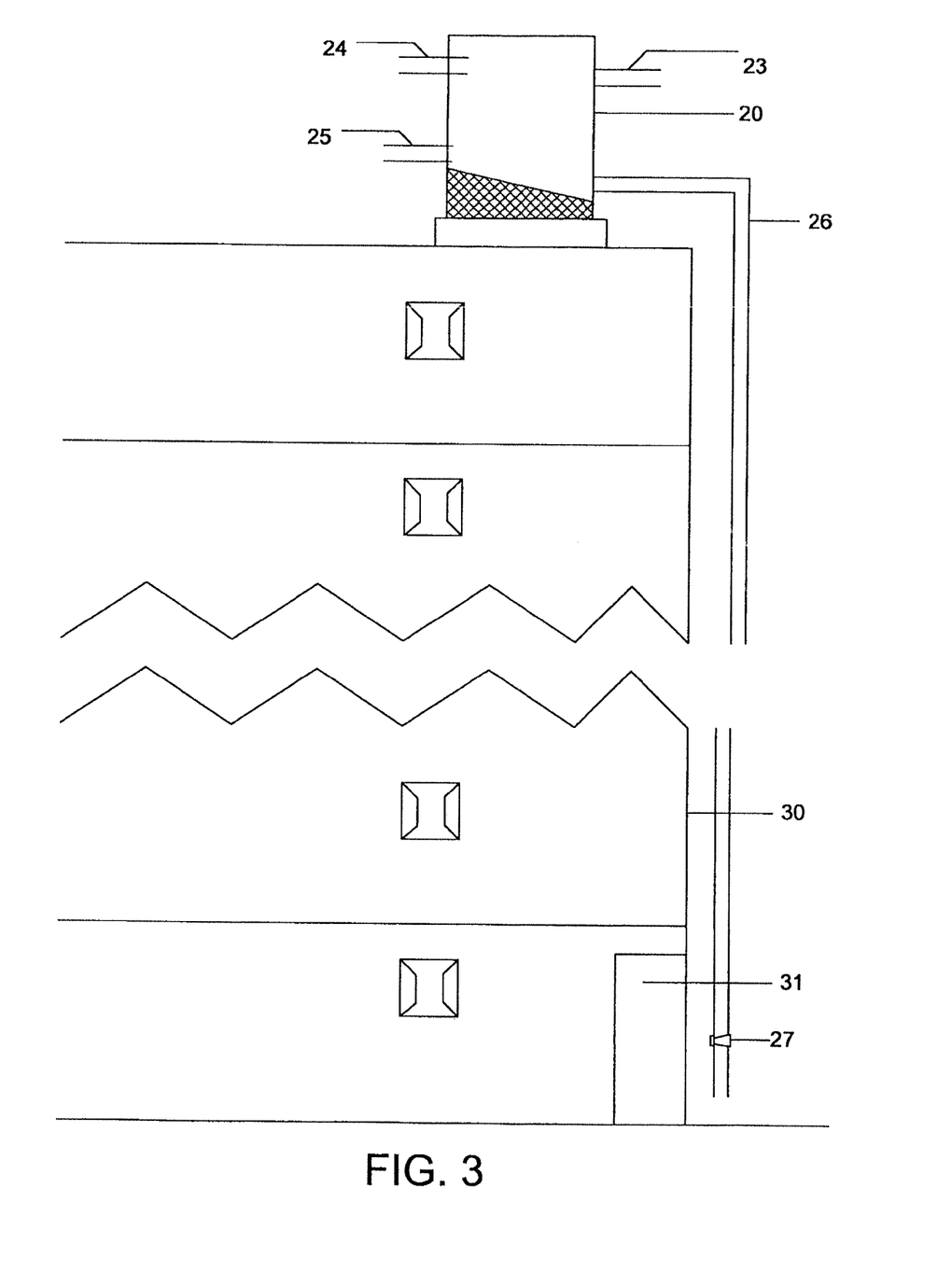
FIG. 3 illustrates a water tank according to another embodiment of the invention with more convenient draining facility.

In FIG. 3, the water tank 20 of the present invention is shown on the top of a building 30. Here its draining outlet pipe has been extended and brought along the height of the building of several floors down to the ground level. Its stop cock 27 is accessible from the ground level and can be operated from there itself and is close to pump room 31 housing the pump which supplies water to the tank 20.

Figure 4:
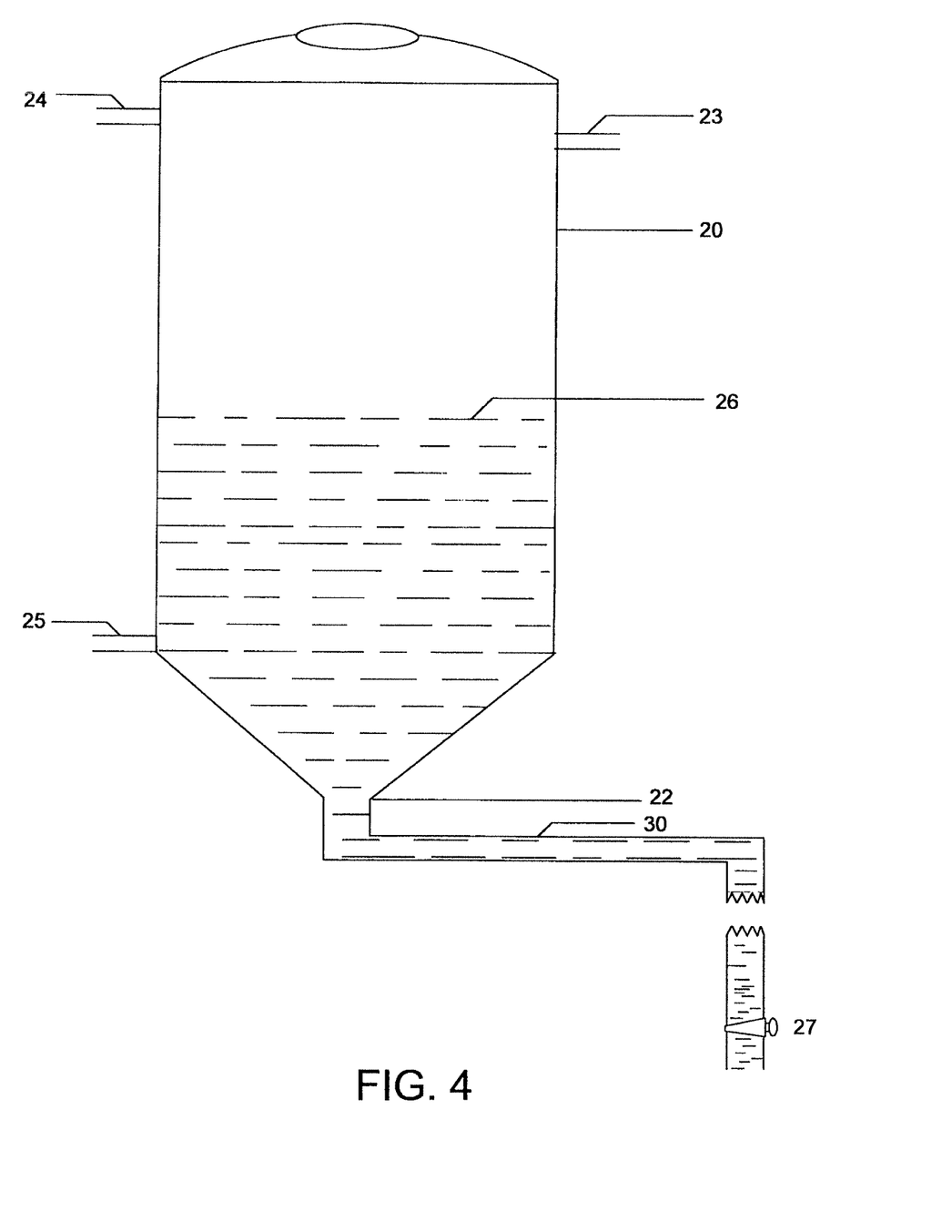
FIG. 4 illustrates a water tank according to yet another embodiment of the invention with further convenient draining facility.

FIG. 4 shows another preferred embodiment of the present invention in which the water tank 20 is filled with water up to level 26. The water inlet is depicted by 24, the overflow outlet by 23, and the supply outlet for consumers by 25. Here the bottom of the tank is inclined from all the sides somewhat into a funnel shape converging at 22 the converging point of the cone, where draining outlet pipe 30 is attached. Said outlet 30 extends to a convenient place from where the draining process can be carried out comfortably at regular intervals through the stop cock 27.

Figure 5:
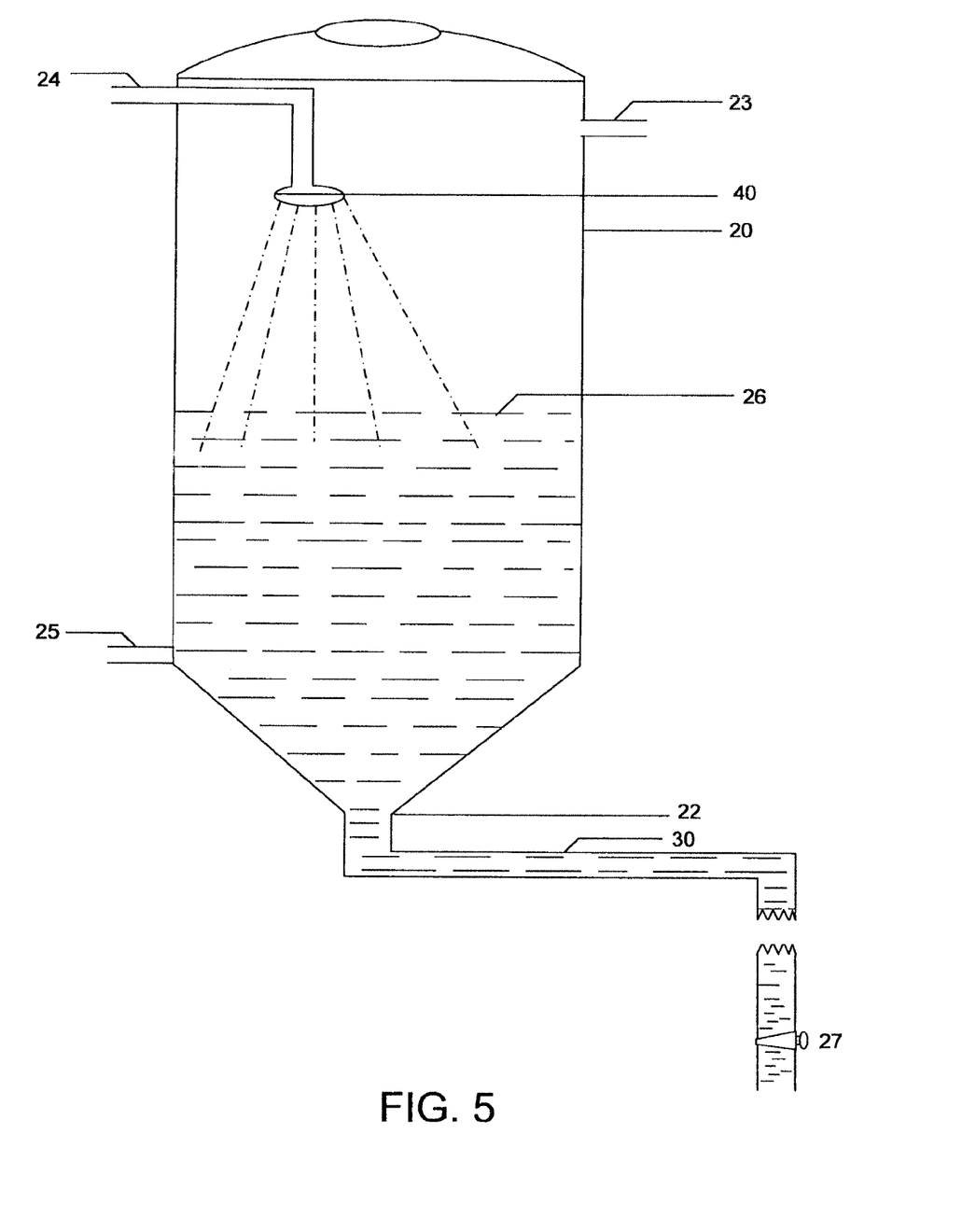
FIG. 5 illustrates a water tank according to still another embodiment of the invention, wherein the water inlet(s) is/are located so as to discharge the inlet water on the inclined surface(s) of the conical bottom of the tank.

FIG. 5 shows a water tank according to still another embodiment of the invention, wherein the water inlet(s) is/are located so as to discharge the inlet water at separated points on the inclined surface(s) of the conical bottom of the tank.

Figure 6:
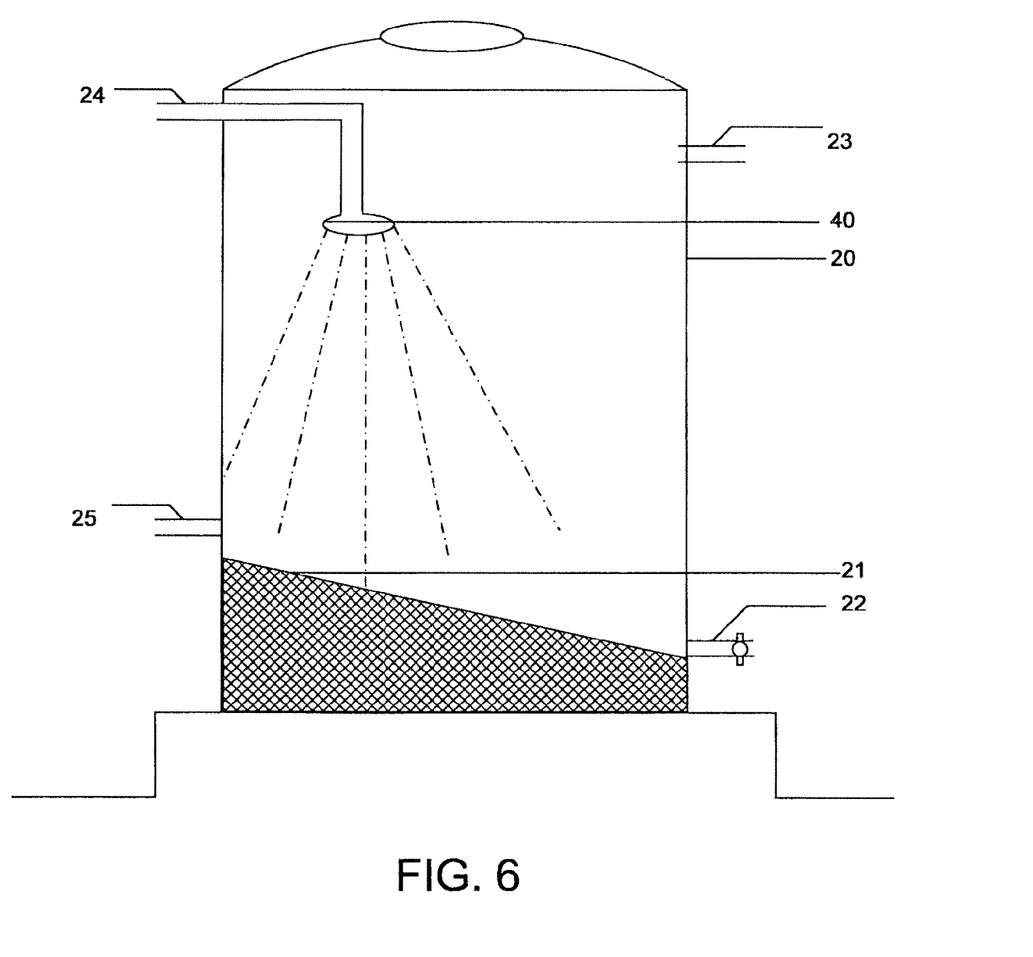
FIG. 6 illustrates a water tank according to still another embodiment of the invention, wherein the water inlet(s) is/are located so as to discharge the inlet water on the inclined surface of the bottom of a rectangular or cylindrical tank.

FIG. 6 shows a water tank according to still another embodiment of the invention, wherein the water inlet(s) is/are located so as to discharge the inlet water on the inclined surface of the bottom of a rectangular or cylindrical tank.

The funnel shape of the tank helps to draw the water with any suspended material inside the tank towards the convergence point 22 when the draining outlet 27 is opened for draining out the contents of the tank. Flow convergence coupled with gravity plays a prominent part relative to a situation where the draining outlet is situated on the periphery or elsewhere. When the tank is filled, all the dirt and foreign matter are directed towards the outlet 22. This helps in draining out the contaminated water and clean the tank.

It can be seen that as the conventional water tank 10 of FIG. 1 is filled everyday, the sediments or foreign matter start depositing from day one. It adds up everyday and over a period of time forms a sludge like layer 15 at the floor of the tank. The cleaning process of such water tank being lengthy, time taking, labour intensive one, requires some preparation and advance planning to carry out the same and the supply of water from this tank requires to be discontinued during the process. The cleaning process in such conventional tank is carried out at fairly longer intervals because the aforesaid difficulties tend to delay the job. For this long period, the users consume everyday, progressively more dirtier water.

In sharp contrast, the proposed water tank 20 provides comparatively much higher level of cleanliness in water which is almost like the fresh water that is filed into the tank everyday due to the fact that the foreign matter in water does not get enough time to deposit at the inclined bottom 21 due to the slope and is regularly drained out through the outlet 22 situated at its lowest point at the end of the slope. This draining out of all contaminated water can be carried out as frequently as desired because this requires only opening and closing of a tap, which even a child can do. In order to make the job still more convenient, the said draining outlet can be extended to a lower floor of convenience closer to the pump, even to the ground level as in FIG. 3 and the stop cock 27 fitted there to enable cleaning of the overhead tank before pumping fresh water into the tank.

A typical action for maintenance of this proposed water tank may be to first drain out the contents of the tank by opening the stop cock 27. When it is fully empty the pump is started. Water starts falling on the floor of the tank through the inlet 24 which dislodges most of the sediments and deposits on the sloping floor of the bottom of the tank that drains out through the outlet 27 or 22, as the case may be. Occasionally, at long intervals, a sponge or cloth like cleaner or brush attached to a long handle can be used to rub out clean the bottom and walls of the tank, if so desired, followed by letting inlet water to flow in for a few minutes to clear these materials and finally the stop cock of the said draining outlet is closed. The tank is then ready to fill with fresh clean water. It can be seen here that in case of a rectangular water tank, some sediments or foreign matter may remain stuck at the lowest edge of the slope of the inclined floor on the two sides of the draining outlet, even after water is drained out. This will need a little pushing by water jet to splash out these sediments. A cylindrical tank may also encounter the same situation but to a lesser extent.

However, the embodiment illustrated in FIG. 4 will not face the above problem at all, because there is no such lowest side of the inclined bottom and all contents rush out without any hindrance towards the centralized draining outlet.

In the embodiment of the invention illustrated in FIG. 5, the water inlet(s) is/are so located as to discharge the inlet water on the inclined surface(s) of the conical bottom of the tank.

It is also observed that a slope of around 15 to 25 degrees to the horizontal of the inclined bottom appears fairy workable for the impurities like a mixture of common soil and sand to move towards the draining outlet if the tank is made of metal. A larger angle will obviously result in a more favourable flow pattern. The material and surface qualities and conditions of the inclined bottom of the tank and the nature of impurities or sediments are also factors that determine the extent of slope for the inclined bottom to make the operation smooth.

This process of complete renewal of water can be carried out frequently—once a week, sooner or even daily if so desired. As a result, the level of dirt in water is not allowed to rise by accumulation over a period of time. This is in contrast with the current scenario where in a conventional water tank the level of dirt keeps on rising everyday progressively till it is cleaned after a long interval. The level of cleanliness in the invented water tank always remains very high and it very rarely requires a thorough cleaning.

The present invention helps to realize the following advantages:— i) The level of dirtiness in the water tank according to the invention remains always at a very low level as compared to a conventional tank, which requires an extensive and expensive cleaning.
ii) The draining out of the contents of the water tank of the present invention is extremely simple and can be carried out regularly and as frequently as desired.
iii) The regular draining out of the content of the water tank of the present invention does not require additional manpower nor any special equipments or arrangement for the purpose and without any long disruption of water supply as in the case of conventional water tank cleaning.
iv) The cost, time and labour involved in maintenance and cleaning the proposed tank is comparatively very low.
v) The resultant health and hygiene benefits for consumers are enormous.

The invention claimed is:

1. A readily cleanable water storage system comprising:
an overhead water tank for storing water,
wherein said water tank comprises:
   a floor;
   one or more inlet(s) for letting water to be filled into said tank;
   a draining outlet with a stop cock fitted thereto;
   an overflow outlet;
   a consumer supply outlet through which water is supplied to consumers; and
   a pump for pumping water from a water supply source to the overhead water tank for storage of water before supply to the consumers,
   wherein the floor of the tank is inclined at a pre-determined continuous and effective slope either towards another point on the periphery to form an inclined floor or from all sides to form a conical bottom with the supply outlet located at the side wall of the tank above a starting end of the inclined floor or above the conical bottom, and the draining outlet is located at the periphery of the inclined floor at the sloping end or at the convergence of the cone formed by the conical bottom, as the case may be, in order to completely discharge the water stored in the tank when draining outlet is opened so that no stale water is retained and wherein said inlet(s) is/are provided with multiple openings or pores to discharge jets of inlet water at different points on the starting end of the inclined floor of the tank or at various points on the inclined surface of the conical bottom of the tank thereby helping to dislodge the impurities adhering to the bottom of the tank more reliably.

2. The water storage system as claimed in claim 1, wherein said draining outlet is extended to a place convenient for the user to operate and the stop cock provided at that point so that the operator can close or open said draining outlet from that point.

3. The water storage system as claimed in claim 1, wherein the stop cock is electronically controlled and a remote control switch is available with the operator for its operation from any place in a building where the water storage system is installed.

4. The water storage system as claimed in claim 3, wherein said remotely controlled stopping mechanism is electrically operated.

5. The water storage system as claimed in claim 1, wherein said stop cock is accessible and capable of being operated from a lower floor of a building where the water storage system is installed by virtue of being fitted in an extended draining outlet pipe at a floor lower to roof level from which it is desired to be operated.

6. The water storage system as claimed in claim 5, wherein said stop cock for the draining outlet is located in proximity to a pump room housing the pump which supplies water to the overhead tank for user's convenience.

7. A method of maintaining cleanliness of water in an overhead tank of the water storage system of claim 1, comprising the steps of:
(a) regularly draining out the water held in the tank by opening a stop cock of the drainage outlet to completely empty the tank;
(b) opening the inlet(s) of tank to dislodge any sediment or deposit still adhering to the floor or bottom of the tank by letting in water jets from one or more water inlet(s) on different points at the starting end of the inclined floor or on different points on the surface of conical bottom of the water tank while keeping the drainage outlet still open, and
(c) refilling the tank with fresh water from the supply inlet after closing the drainage outlet.

8. The method as claimed in claim 7, wherein water jets through the multiple pores or openings of the one or more water inlet(s) fall directly on the impurities or foreign matters, if any, collected on the bottom of the water tank such that those are easily dislodged.

9. The method as claimed in claim 7, wherein, occasionally, a sponge or cloth like cleaner or brush attached to a long handle is used to rub out and clean the floor and walls of the tank, followed by water being allowed to flow in the said tank for some time through the multiple pores or openings of one or more water inlets for final cleaning before closing the stop cock of the said draining outlet to hold fresh clean water in the tank.

10. The method as claimed in claim 7, wherein the periodicity of the cleaning schedule may be before every filling, daily or as frequently as convenient or practicable.

* * * * *